US011868075B2

(12) United States Patent
Uchitani et al.

(10) Patent No.: US 11,868,075 B2
(45) Date of Patent: Jan. 9, 2024

(54) IMAGING SYSTEM WITH FOAM MATERIAL FOR LUBRICANT ROLLER

(71) Applicant: HEWLETT-PACKARD DEVELOPMENT COMPANY, L.P., Spring, TX (US)

(72) Inventors: Takeshi Uchitani, Kanagawa (JP); Katsushi Higashida, Kanagawa (JP); Takayuki Wakai, Kanagawa (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 36 days.

(21) Appl. No.: 17/782,308

(22) PCT Filed: Oct. 21, 2020

(86) PCT No.: PCT/US2020/056580
§ 371 (c)(1),
(2) Date: Jun. 3, 2022

(87) PCT Pub. No.: WO2021/118693
PCT Pub. Date: Jun. 17, 2021

(65) Prior Publication Data
US 2023/0029966 A1 Feb. 2, 2023

(30) Foreign Application Priority Data
Dec. 9, 2019 (JP) ................................ 2019-222367

(51) Int. Cl.
*G03G 21/00* (2006.01)
*G03G 5/147* (2006.01)

(52) U.S. Cl.
CPC ..... *G03G 21/0094* (2013.01); *G03G 5/14704* (2013.01); *G03G 5/14791* (2013.01)

(58) Field of Classification Search
CPC ................................................. G03G 21/0094
See application file for complete search history.

(56) References Cited

U.S. PATENT DOCUMENTS

| | | | | | |
|---|---|---|---|---|---|
| 2012/0141177 | A1* | 6/2012 | Urayama | G03G 21/0094 399/346 |
| 2013/0251381 | A1* | 9/2013 | Seki | G03G 21/0094 399/24 |
| 2015/0139710 | A1* | 5/2015 | Hasegawa | G03G 21/0094 399/346 |
| 2018/0373198 | A1* | 12/2018 | Mizusawa | G03G 21/0094 |

FOREIGN PATENT DOCUMENTS

| | | | |
|---|---|---|---|
| JP | 2003-91106 | A | 3/2003 |
| JP | 2009-150986 | A | 7/2009 |
| JP | 2010-281923 | A | 12/2010 |
| JP | 2011-112677 | A | 6/2011 |
| JP | 2013-20236 | A | 1/2013 |
| JP | 2014-85615 | A | 5/2014 |
| JP | 2014-211471 | A | 11/2014 |
| JP | 6020890 | B2 | 11/2016 |

* cited by examiner

*Primary Examiner* — Jessica L Eley
(74) *Attorney, Agent, or Firm* — Foley & Lardner LLP

(57) ABSTRACT

An imaging system includes a lubricant roller to transfer a lubricant to the image carrier, a solid lubricant in contact the lubricant roller to supply the lubricant to the lubricant roller, and a pressing member to urge the solid lubricant against the lubricant roller. The lubricant roller includes a foam that is in contact with the image carrier. The foam is selected to have a permeability of approximately 0.15 $dm^3/s$ to 1.4 $dm^3/s$.

13 Claims, 11 Drawing Sheets

IMAGING SYSTEM WITH FOAM MATERIAL FOR LUBRICANT ROLLER

BACKGROUND

Some imaging apparatuses include a mechanism to apply a lubricant to a surface of an image carrier. In such imaging apparatuses, the applied lubricant lowers a friction coefficient of the surface of the image carrier so that a residual toner is removed more easily from the image carrier.

DETAILED DESCRIPTION

In the following description, with reference to the drawings, the same reference numbers are assigned to the same components or to similar components having the same function, and overlapping description is omitted. Hereinafter, an example of an imaging system will be described with reference to the drawings. The imaging system may be an imaging apparatus such as a printer or the like, according to some examples, or a component of an imaging apparatus such as a lubricant applying device or the like, according to other examples.

Figure 1:
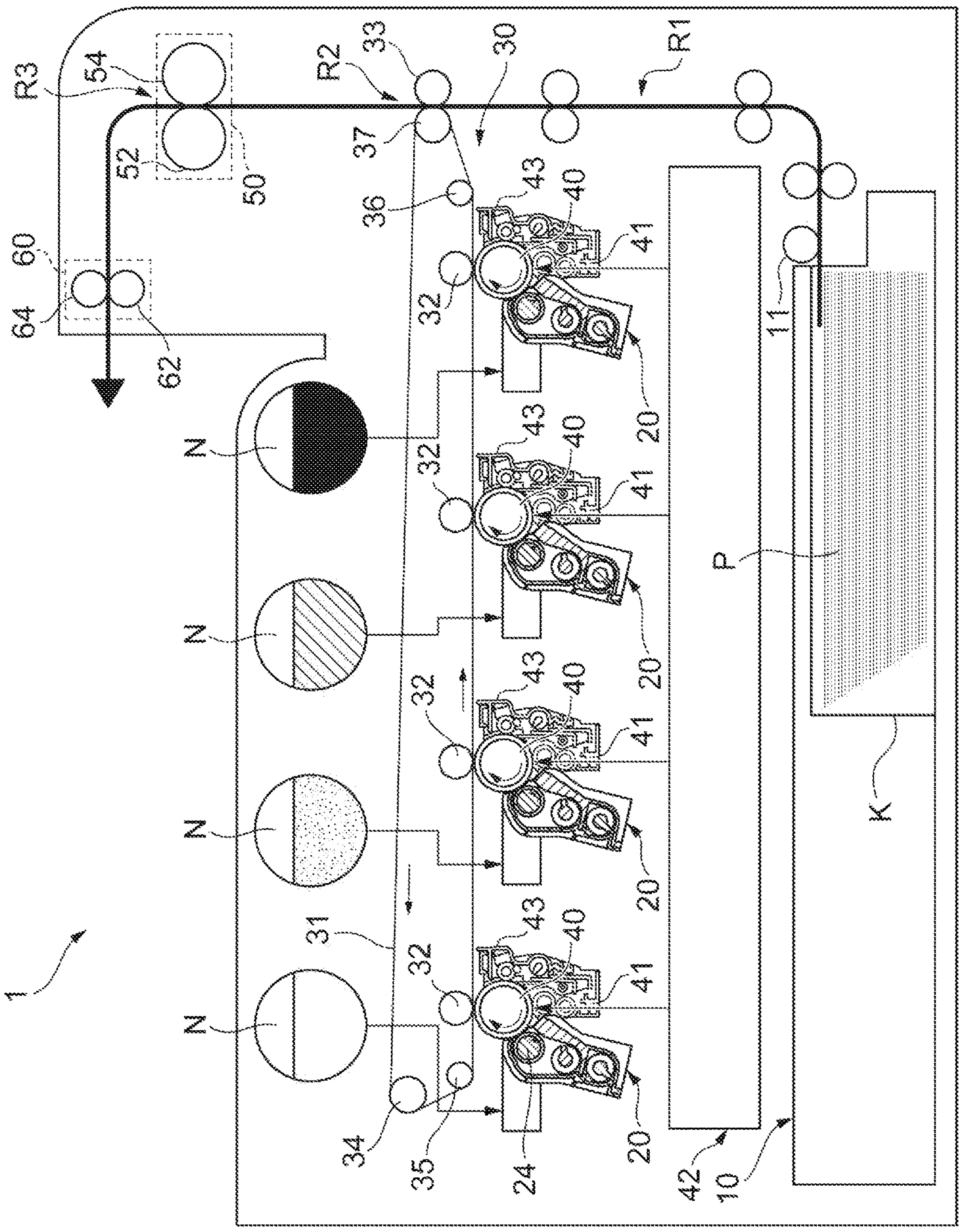
FIG. 1 is a schematic diagram of an example imaging apparatus.

FIG. 1 is a diagram illustrating a schematic configuration of an example imaging apparatus 1. The imaging apparatus 1 may form a color image by using respective colors of cyan, magenta, yellow, and black (CMYK). The imaging apparatus 1 may include, for example, a conveying device 10 which conveys a sheet P corresponding to a recording medium, developing devices 20 each of which develop an electrostatic latent image, a transfer device 30 which secondarily transfers a toner to the sheet P, image carriers 40 each of which form an electrostatic latent image on a surface (a circumferential surface) thereof, a fixing device 50 which fixes a toner to the sheet P, and a discharging device 60 which discharges the sheet P.

The conveying device 10 may convey the sheet P which is a recording medium having an image formed thereon on a conveyance route R1. The sheets P may be accommodated in a cassette K, for example, in a stacked state to be picked up and conveyed by a feeding roller 11. The conveying device 10 directs the sheet P to reach a transfer nip portion R2 through the conveyance route R1, for example, at a timing in which the toner to be transferred to the sheet P reaches the transfer nip portion R2.

Four developing devices 20 may be provided for each of the colors of cyan, magenta, yellow, and black. Each developing device 20 includes, for example, a developer carrier 24 which carries a toner on the image carrier 40. In the developing device 20, a two-component developer containing a toner and a carrier may be used as a developer. For example, in the developing device 20, the toner and the carrier are adjusted to a targeted mixing ratio and the toner and the carrier are mixed and stirred so as to disperse the toner. Accordingly, the developer is adjusted so that an optimal charge amount is applied thereto. The developer is carried on the developer carrier 24. The developer carrier 24 rotates so that the developer is conveyed to a region facing the image carrier 40. Then, the toner in the developer carried on the developer carrier 24 is transferred to the electrostatic latent image formed on the peripheral surface of the image carrier 40 so as to develop the electrostatic latent image.

The transfer device 30 conveys, for example, the toner image developed by the image carriers 40 to the transfer nip portion R2 where the toner image is secondarily transferred to the sheet P. The transfer device 30 includes, for example, a transfer belt 31 to which the toner image is primarily transferred from the image carriers 440, tension rollers 34, 35, 36, and 37 which tension the transfer belt 31, primary transfer rollers 32 located adjacent the transfer belt 31 to position the transfer belt 31 between the respective primary transfer rollers 32 and the respective image carriers 440, and a secondary transfer roller 33 located adjacent the transfer belt 31 to position the transfer belt 31 between the secondary transfer roller 33 and the tension roller 37.

The transfer belt 31 is, for example, an endless belt which moves (or rotates) in a circulating manner by the tension rollers 34, 35, 36, and 37. The tension rollers 34, 35, 36, and 37 are rotatable about their respective axes. The tension roller 37 is, for example, a drive roller which rotates in a driving manner around the axis. The tension rollers 34, 35, and 36 are, for example, driven rollers which rotate in a driven manner as the tension roller 37 rotates in a driving manner. The primary transfer rollers 32 are positioned to urge or press the transfer belt 31 against the image carriers 40 from the inner circumference of the transfer belt 31. The secondary transfer roller 33 is disposed parallel to the tension roller 37, for example, with the transfer belt 31 interposed therebetween and is positioned to urge or press the transfer belt 31 against the tension roller 37 from the outer circumference of the transfer belt 31. Accordingly, the secondary transfer roller 33 forms the transfer nip portion R2 between the secondary transfer roller 33 and the transfer belt 31.

The image carrier 40 may also be referred to as an electrostatic latent image carrier or a photoconductor drum.

Four image carriers 40 are provided for the respective colors of cyan, magenta, yellow, and black. The image carriers 40 are arranged adjacent the transfer belt, for example, so as to be spaced apart along the movement direction of the transfer belt 31. In some examples, the developing device 20, a charging roller 41, an exposure unit 42, and a cleaning device 43 are provided on the peripheral surface of each of the image carriers 40.

The charging roller 41 may charge the surface of the image carrier 40 to a predetermined potential. The charging roller 41 may move (or rotate) in accordance with the rotation of the image carrier 440, for example. The exposure unit 42 may expose the surface of the image carrier 40 having been charged by the charging roller 41 in accordance with an image formed on the sheet P. Accordingly, a potential of a portion exposed by the exposure unit 42 in the surface of the image carrier 40 changes so as to form an electrostatic latent image. Four developing devices 20 corresponding to the four colors, may each develop the electrostatic latent image formed on the associated image carrier 40 by using the toner supplied from an associated one of the toner tanks N provided to face each developing device 20 so as to generate the toner image. The toner tanks N may be respectively filled with, for example, magenta, yellow, cyan, and black toners. The cleaning device 43 collects, for example, the toner remaining on the image carrier 40 after the toner formed on the image carrier 40 is primarily transferred to the transfer belt 31. The cleaning device 43 includes a device for applying a lubricant to the surface of the image carrier 40 to be described.

The fixing device 50 directs the sheet P to pass through a fixing nip point R3, for example, for heating and pressing the sheet so that the toner image secondarily transferred from the transfer belt 31 to the sheet P is fixed to the sheet P. The fixing device 50 includes, for example, a heating roller 52 which heats the sheet P and a pressing roller 54 which rotationally drives the heating roller 52 in a pressed state. The heating roller 52 and the pressing roller 54 may each have a substantially a cylindrical shape and the heating roller 52 may include a heat source such as a halogen lamp provided therein. The fixing nip portion R3 corresponds to a contact region and may be provided between the heating roller 52 and the pressing roller 54. When the sheet P passes through the fixing nip portion R3, the toner image is melted and fixed to the sheet P.

The discharging device 60 includes, for example, discharging rollers 62 and 64 to discharge the sheet P having the toner image fixed thereon, to the outside of the apparatus.

An example printing process using the example imaging apparatus 1 will be described. When an image signal of a recording target image is input to the imaging apparatus 1, a control unit (or controller) of the imaging apparatus 1 rotates the feeding roller 11 so as to pick up and convey the sheet P stacked in the cassette K. In a charging operation, the surface of each of the image carriers 40 is charged to a predetermined potential by the charging roller 41. In an exposing operation, the surface of each of the image carriers 40 is irradiated with a laser beam by an associated one of the exposure units 42 based on the received image signal so as to form the respective electrostatic latent images on the respective image carriers.

In a developing operation, the electrostatic latent image is developed for each developing device 20, so as to form the toner image. In a transfer operation, each toner image formed in this way is primarily transferred from the image carrier 40 to the transfer belt 31 at a region where the image carrier 40 faces the transfer belt 31. The toner images formed on the four image carriers 40 are sequentially layered on the transfer belt 31 so as to form a single composite toner image. Then, the composite toner image is secondarily transferred to the sheet P conveyed from the conveying device 10 at the transfer nip portion R2 where the tension roller 37 faces the secondary transfer roller 33.

The sheet P to which the composite toner image is secondarily transferred is conveyed to the fixing device 50. In a fixing operation, the fixing device 50 melts and fixes the composite toner image to the sheet P by heating and pressing the sheet P between the heating roller 52 and the pressing roller 54 when the sheet P passes through the fixing nip portion R3. Then, the sheet P is discharged to the outside of the imaging apparatus 1 by the discharging rollers 62 and 64.

Figure 2:
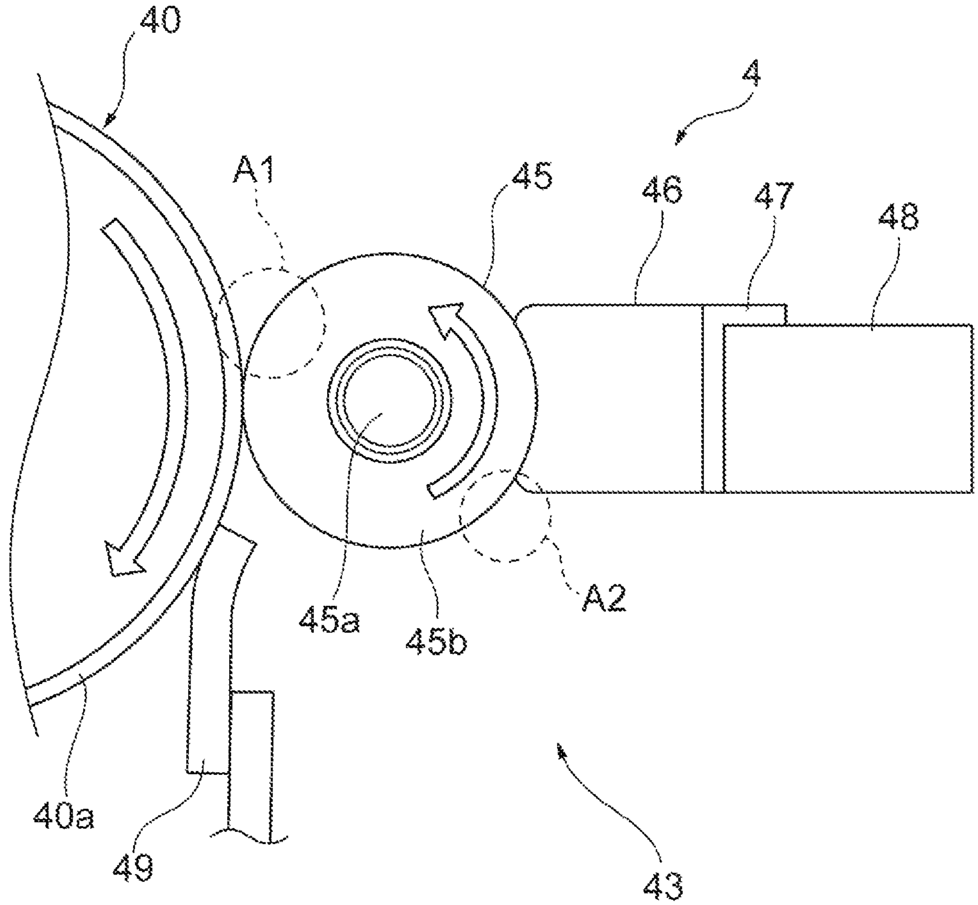
FIG. 2 is a schematic diagram of an example lubricant applying device of an imaging apparatus.
Figure 3:
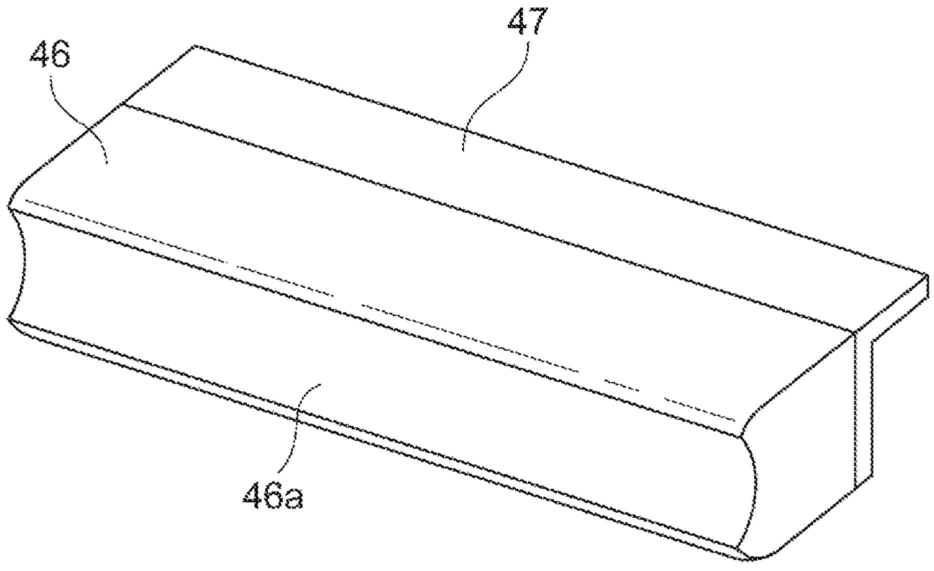
FIG. 3 is a perspective view of a holding member of the lubricant applying device of FIG. 2, illustrated with a solid lubricant.

An example lubricant applying device 4 that is provided in the cleaning device 43 will be described with reference to FIGS. 2 and 3. FIG. 2 is a schematic diagram of the example lubricant applying device 4. FIG. 3 is a perspective view of a solid lubricant 46 used in the lubricant applying device 4 illustrated in FIG. 2. The example lubricant applying device 4 includes a lubricant roller 45, the solid lubricant 46, a holding member 47, and a pressing member 48. The cleaning device 43 is further provided with a cleaning blade 49. The lubricant applying device 4 supplies a predetermined amount of the lubricant to the surface of the image carrier 40 with each rotation, so as to reduce the wear rate of the surface of the image carrier 40 (the amount of wear relative to travel distance), in order to protect the surface of the image carrier 40.

The lubricant roller 45 is disposed between the image carrier 40 and the solid lubricant 46 so as to transfer the lubricant of the solid lubricant 46 to the surface of the image carrier 40. For example, the lubricant roller 45 may rotate counterclockwise such that the portion of the surface of the lubricant roller that contacts the image carrier moves (or advances) in a forward direction. The portion of the surface that is in contact with the image carrier 40 forms an image-carrier contact region. The image carrier 40 may rotate clockwise so that the surface of the image carrier 40 at the image-carrier contact region moves in the same forward direction. The lubricant roller 45 includes a columnar shaft portion 45*a* which extends in the axial direction (a direction that is orthogonal to the view shown in FIG. 2) and a cylindrical foam 45*b* which covers the outer periphery of the shaft portion 45*a*. The foam 45*b* contacts the image carrier 40 at an image-carrier contact region located at one side (a first side) of the lubricant roller 45, and contacts the solid lubricant 46 at a lubricant contact region located at the other side (a second side opposite the first side) of the lubricant roller 45. The lubricant roller 45 scrapes off the lubricant at the lubricant contact region of the lubricant roller 45 that is in contact with the solid lubricant 46 (the curved surface 46*a*), and supplies the scraped lubricant to the surface of the image carrier 40 at the image-carrier contact region of the lubricant roller 45 that is in contact with the image carrier 40. The thickness of the foam 45*b* may be, for example, of 1 mm to 4 mm. For example, when the outer peripheral diameter of the foam 45*b* is 10 mm, the thickness can be set to 2 mm. The foam 45*b* may be made of urethane foam, for example. The characteristics of the foam 45*b* will be described below.

With reference to FIG. 3, the solid lubricant 46 may be bar-shaped to extend in the axial direction of the lubricant roller 45 and may have a contact surface that contacts the foam 45*b* and forms a curved surface 46*a*. The curved surface 46*a* may match the outer peripheral surface of the lubricant roller 45 that comes into contact or may be a curved surface that has a curvature radius greater than the outer diameter of the outer peripheral surface of the lubricant roller 45. The solid lubricant 46 functions as a supply source for a lubricant to be applied to the surface of the image carrier 40. When the lubricant is supplied to the surface of the image carrier 40 through the lubricant roller 45, the remaining toner (the residual toner) transferred from the image carrier 40 to the transfer belt 31 is more easily removed from the surface and so as to reduce the wear of the surface of the image carrier 40.

The lubricant constituting the solid lubricant 46 may be composed of a fatty acid metal salt or a fluororesin, for example. Examples of the fatty acid metal salt include fatty acid metal salts of linear hydrocarbons such as myristic acid, palmitic acid, stearic acid, and oleic acid, and examples of the metal include lithium, magnesium, calcium, strontium, zinc, cadmium, aluminum, cerium, titanium, magnesium stearate, aluminum stearate, and iron stearate. As the fatty acid metal salt, for example, zinc stearate can be used.

The holding member 47 holds the solid lubricant 46. The holding member 47 may be made of a steel plate such as SECC, for example, and may have an L shape.

The pressing member 48 is a member that presses or urges the solid lubricant 46 against the lubricant roller 45 at a predetermined load. The pressing member 48 includes, for example, a compression spring. The pressing member 48 presses the solid lubricant 46 through the holding member 47, but may press the solid lubricant 46 without using the holding member 47. The pressing member 48 can urge the solid lubricant 46 with a spring load of 0.1 N to 6 N (approximately 10 gf to 610 gf), for example. In this case, the solid lubricant 46 may be pressed against the lubricant roller 45 with a load of 0.5 N to 6.4 N (approximately 50 gf to 650 gf), for example, including the weight of the solid lubricant 46.

The cleaning blade 49 is disposed so as to contact the surface of the image carrier 40 to scrape off the residual toner of the image carrier 40. The lubricant roller 45 is disposed on an upstream side of the cleaning blade 49 in a rotational direction of the image carrier 40. The cleaning blade 49 cleans the surface of the image carrier 40 by scraping off the residual toner not carried by the lubricant roller 45 in the residual toner on the surface of the image carrier 40. The residual toner of the image carrier 40 is cleaned by the cleaning blade 49, to increase quality of a next electrostatic latent image formed on the surface of the image carrier 40 and increase the quality of the toner image to be formed and transferred. In the example, no cleaning device similar to the cleaning blade 49 is provided on the upstream side of the image-carrier contact region of the lubricant roller 45 (in the rotational direction of the image carrier 40), so as to reduce the size and cost of the cleaning device 43 including the lubricant applying device 4.

An example of a configuration of the image carrier 40 to which the lubricant applying device 4 applies lubricant, will be described. The image carrier 40 may be an organic photoconductor (OPC) and the image carrier may include an outermost layer having a protective layer 40*a*. The protective layer 40*a* may be composed of filler particles and a curable resin (organic compound) obtained by curing a compound having a plurality of polymerizable functional groups and may contain 1% by mass to 30% by mass of filler particles of 50 nm to 500 nm in the curable resin. The filler particles contained in the protective layer 40*a* may include at least one kind of particles selected from the group consisting of silica particles, alumina particles, and titanium oxide particles, for example. Such a protective layer 40*a* may be provided on the outermost layer of the image carrier 40 to reduce the wear rate of the image carrier 440, for example, the amount of wear relative to travel distance of the image carrier 40.

The protective layer 40*a* is formed by dissolving at least a compound having a polymerizable functional group in a solvent and introducing a filler particle into the solvent to obtain a coating solution, and by curing (polymerizing) a coating film obtained from the coating solution by using a crosslinking or polymerization reaction. The compound having a polymerizable functional group may be a polymerizable monomer, or a dimer to an oligomer in which a plurality of such units are connected. Examples of the compound having a polymerizable functional group include compounds having a chain polymerizable functional group such as an acryloyloxy group, a methacryloyloxy group, and a styryl group. A compound having a sequentially polymerizable functional group such as a hydroxyl group, an alkoxysilyl group, an isocyanate group, and an epoxy group may be used. For the curing reaction, for example, radical polymerization, ionic polymerization, thermal polymerization, photopolymerization, radiation polymerization (electron beam polymerization), plasma CVD, photo-CVD, and the like can be used.

In some examples, a charge transport material may be added to the protective layer coating solution to increase the charge transportability of the protective layer 40*a*. Additives can be added to further enhance various functions. Examples of the additives include conductive particles, antioxidants, ultraviolet absorbers, plasticizers, and leveling agents. The layer thickness of the protective layer 40*a* may be of 0.1 μm to 10 μm according to some examples, or of 1 μm to 7 μm in other examples.

The characteristics of the foam 45*b* of the lubricant roller 45 of the lubricant applying device 4 will be described. As described above, no cleaning blade is provided on the upstream side of the image-carrier contact region of the lubricant roller 45 in the rotational direction of the image carrier 40. Accordingly, the lubricant roller 45 may remove excess toner to limit a thickness of the residual toner remaining on the image carrier 40 to a maximum thickness. For example, the residual toner remaining unevenly in the axial direction may be first scraped off by the lubricant roller 45. Accordingly, the amount of the toner carried by the foam 45*b* may be uneven in the axial direction. When the amount of the toner be carried increases, the toner may tend to be abrasive such that the curved surface 46*a* of the solid lubricant 46 and the amount of the lubricant scraped off from the curved surface 46*a* also tend to become uneven in the axial direction. The example lubricant applying device 4 prevents such unevenness by selecting the characteristics of the foam 45*b* of the lubricant roller 45 as will be described.

In some examples, the foam 45*b* is formed as a continuous foam and the characteristics of the foam are selected so that the amount of the toner carried by the foam 45*b* is set to be 20 mg/mm or less on average in the axial direction when the imaging apparatus 1 is operated, for example, when the imaging process is started so that the electrostatic latent image is continuously (or repeatedly) formed on the surface of the image carrier 40 and a certain degree of the toner remains on the surface of the image carrier 40. The toner carriage amount indicates the toner carriage amount relative to a length (mm) of the foam 45*b* in the longitudinal direction. The toner carried along the circumference of the foam 45*b* is collected, for example by suction, and the weight of the toner collected is measured and calculated. The index of the carriage amount is calculated from the toner carriage amount of the foam 45*b* when the amount of the lubricant supplied to the surface of the image carrier 40 is in a predetermined range, for example, of 3 to 15 mg/kc/m. "Kc" used herein is a kilocycle, which corresponds to 1000 rotation cycles of the image carrier 40 (photoconductor). The rotation of the lubricant roller 45 subjects the foam 45*b* to a compression and decompression cycle in which the foam 45*b* is compressed at the upstream region A1 of the image-carrier contact region and then decompressed downstream the image-carrier contact region, and further compressed at the upstream region A2 of the lubricant contact region and decompressed downstream the lubricant contact region.

In order to keep the toner carriage amount of the foam 45*b* within the index of 20 mg/mm or less as will be described, a foam having a permeability of 0.15 $dm^3/s$ to 1.4 $dm^3/s$ is selected as the foam 45*b*. The "permeability" is, for example, an airflow value measured according to the standardized measuring method JIS K 6400-7 Method B. According to the method, the permeability is measured on a test piece which is a piece of foam, using a test device according to the automatic airflow measurement device used in Method B (Annex A) of the JIS K 6400-7 standard. The air flow value is calculated as an air volume that maintains a targeted pressure loss constant. For example, the pressure loss may correspond to a difference between a pressure in the airflow observed upstream the test piece and a pressure observed downstream the test piece. The foam 45*b* may be selected from a foam having a permeability of 0.2 $dm^3/s$ to 1.3 $dm^3/s$ according to some examples, or from a foam having a permeability of 0.5 $dm^3/s$ to 1.2 $dm^3/s$ according to other examples.

The foam 45*b* may be further selected to have a density of 48 $kg/m^3$ to 67 $kg/m^3$ in some examples, or of 50 $kg/m^3$ to 65 $kg/m^3$ in other examples. In addition, the foam 45*b* may be selected to have a 25% hardness of 185 N to 305 N in some examples, or of 190 N to 300 N. The "25% hardness" is a value measured according to the measuring method JIS K 6400-2 Method D. According to this test, a test piece of 50 mm×380 mm×380 mm is cut out from a target product, the cut test piece is pressed vertically to reach a strain level corresponding to 75% of the strain amount of the test piece at the initial thickness by applying a load from a pressing plate having a diameter of 200 mm. Immediately after removing the load of the pressing plate, the test piece is pressed again to reach a strain level corresponding to 25% of the strain amount of the test piece at the initial thickness. The test piece is maintained at this strain level of 25% (a stop state), and after 20 seconds have elapsed from the stop state, the load applied is measured and the measured load is set to a value of "25% hardness".

The foam 45*b* for the lubricant applying mechanism is selected to be within the above-described ranges of permeability, density, and 25% hardness to order to adjust the amount of the toner carried on the foam 45*b*. According to examples, the selection of the foam may be based on the following test. According this test, the lubricant roller 45 of the lubricant applying device 4 of the configuration illustrated in FIG. 2 was sequentially replaced with prototype S1 to prototype S6 which include foams having the permeabilities, densities, and 25% hardnesses shown in Table 1 below, and the toner carriage amount of the foam of the lubricant roller according to each of prototypes S1 to S2, was measured. The circumferential speed of the image carrier was set to 280 mm/s and the circumferential speed ratio of the lubricant roller was set to 0.5 to 1.2 with respect to the image carrier.

TABLE 1

| | Prototypes | | | | | |
|---|---|---|---|---|---|---|
| | S1 | S2 | S3 | S4 | S5 | S6 |
| Permeability ($dm^3/s$) | 0.1 | 0.2 | 0.9 | 1.3 | 1.5 | 2.3 |
| Density ($kg/m^3$) | 70 | 65 | 57 | 50 | 45 | 30 |
| 25% Hardness (N) | 315 | 300 | 200 | 190 | 180 | 130 |

Figure 4:
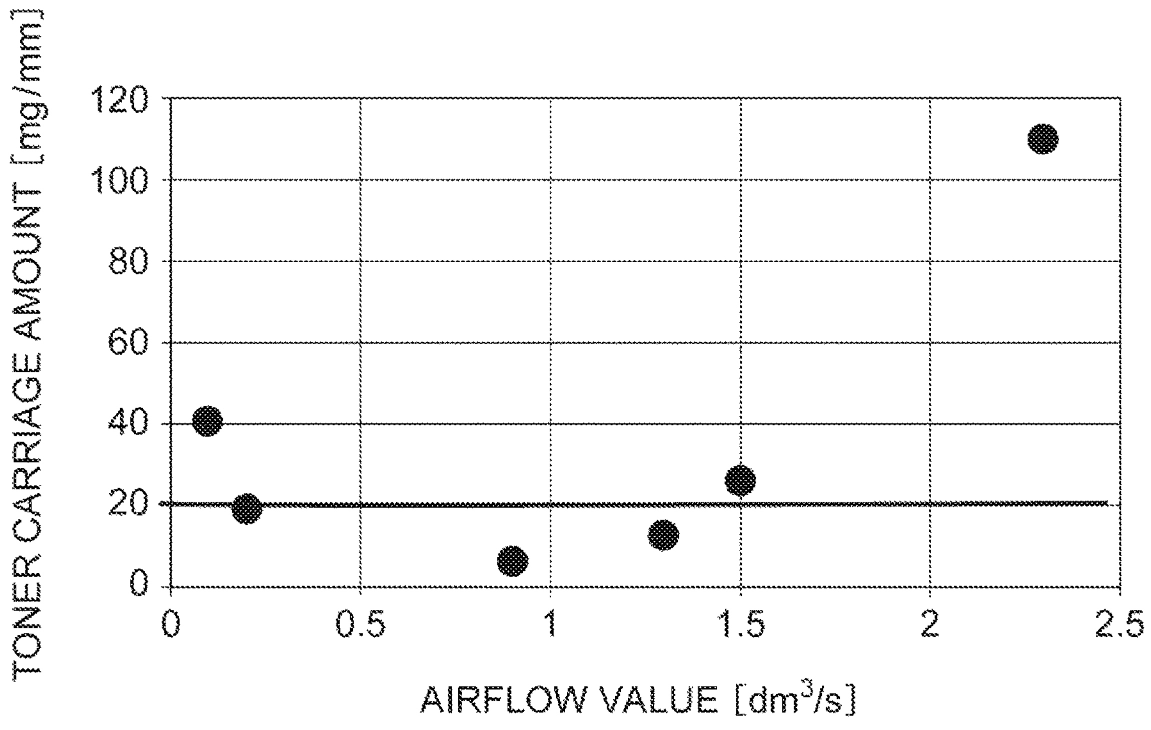
FIG. 4 is a graph of a toner carriage amount relative to a permeability in example lubricant applying devices.

The toner carriage amount of the lubricant applying device with the lubricant roller having the foam according to prototype S1 to prototype S6 was measured and the measurement results are shown in FIG. 4 and Table 2.

TABLE 2

| | Prototype | | | | | |
|---|---|---|---|---|---|---|
| | S1 | S2 | S3 | S4 | S5 | S6 |
| Toner carriage amount (mg/mm) | 40.3 | 19.1 | 6.51 | 12.5 | 25.8 | 110 |

With reference to the results of FIG. 4 and Table 2 above, the toner carriage amount was greater than a prescribed value of 20 mg/mm, in prototype S1, prototype S5, and prototype S6. In this case, an uneven distribution of the amount of the toner carried on the lubricant roller 45 in the axial direction may increase. For example, the toner carriage amount on the foam reaches a maximum (or upper limit) in a region aligned with a region of the image carrier 40 where a printing process is continuously (or repeatedly) performed, and the toner carriage amount on the foam is less in a region aligned with a portion of the image carrier 40 where the printing process is not continuously performed. Accordingly, unevenness can occur along the axial direction.

In the prototypes S2 to S4, the toner carriage amount could achieve less than the prescribed value of 20 mg/mm. In this case, unevenness of the toner carriage amount of the lubricant roller 45 in the axial direction can be reduced. For example, since the upper limit value is limited to 20 mg/mm in regions where the printing process is continuously performed or not in the image carrier 440, unevenness in the axial direction is inhibited from occurring.

Accordingly, the foam 45*b* is selected to have a permeability of 0.15 $dm^3/s$ to 1.4 $dm^3/s$, to set the toner carriage amount to a predetermined range. For example, when the permeability of the foam 45*b* is less than 0.15 $dm^3/s$, the permeability in the foam 45*b* is initially relatively low, which inhibits generating an airflow required to discharge the carried toner to an outside of the foam 45*b* even when the cycles of compression and decompression (or release) the foam 45*b* caused by the rotation operation are performed in the image-carrier contact region between the image carrier 40 and the lubricant roller 45 or the lubricant contact region between the solid lubricant 46 and the lubricant roller 45. When the permeability of the foam 45*b* is greater than 1.3 $dm^3/s$ (e.g., when a sponge is too scuffed), it is not possible to generate an airflow required to discharge the toner to the outside of the foam 45*b* even when the cycles of compressing and releasing the foam 45*b* by the rotation operation are performed, and the toner is accumulated on the foam 45*b*.

Accordingly, the foam 45*b* of the lubricant roller 45 in the example lubricant applying device 4, is selected to have a permeability of 0.15 $dm^3/s$ to 1.4 $dm^3/s$, to generate an airflow required to discharge the carried toner in the foam 45*b* to the outside of the foam 45*b*, by performing the cycles of compressing and releasing the foam 45*b* by the rotation operation in a region A1 before entering the image-carrier contact region between the image carrier 40 and the lubricant roller 45, or a region A2 before entering the lubricant contact region between the solid lubricant 46 and the lubricant roller 45. An amount of toner, which may correspond to a predetermined amount or more, is projected by this airflow to the outside of the foam 45*b* such that the lubricant roller 45 carries a more constant amount of the toner.

An application state and a consumption state of the lubricant by the imaging apparatus 1 including the lubricant applying device 4 having the above-described configuration will be described as a first imaging apparatus, in comparison a second imaging apparatus having a different lubricant applying device. In the lubricant applying device of the second imaging apparatus, a brush roller made of conductive polyethylene terephthalate (PET) is used instead of the lubricant roller 45. The thickness of each fiber used in the conductive brush roller is 3d (denier) and the yarn used in the brush is a single set of 200k thin fibers (200 kF). The lubricant applying devices include no cleaning blade (for scraping off residual toner) on the upstream side of the lubricant applying device, in the rotational direction of the image carrier.

Figure 5:
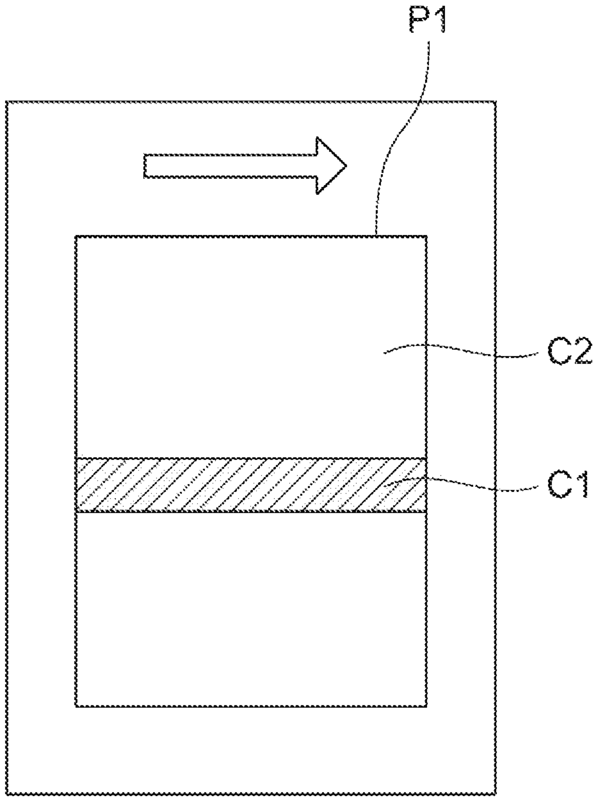
FIG. 5 is a diagram showing an example of an image being printed by the example imaging apparatus.

With reference to FIG. 5, for comparing the above-described two lubricant application devices, a pattern of continuously printing a center portion C1, exclusively, of the printing sheet P1, is considered as an image printing condition. According to this pattern, the center portion C1 is located at a substantially center location in the longitudinal direction of the printing sheet P1, and a remaining portion C2 that excludes the center portion C1, is free of printing. According to this printing pattern, a relatively large amount of residual toner on the image carrier tends to remain in the center portion (a region corresponding to the center portion C1) of the lubricant roller, in which the center portion is substantially located at a center in the longitudinal direction of the lubricant roller.

Figure 6:
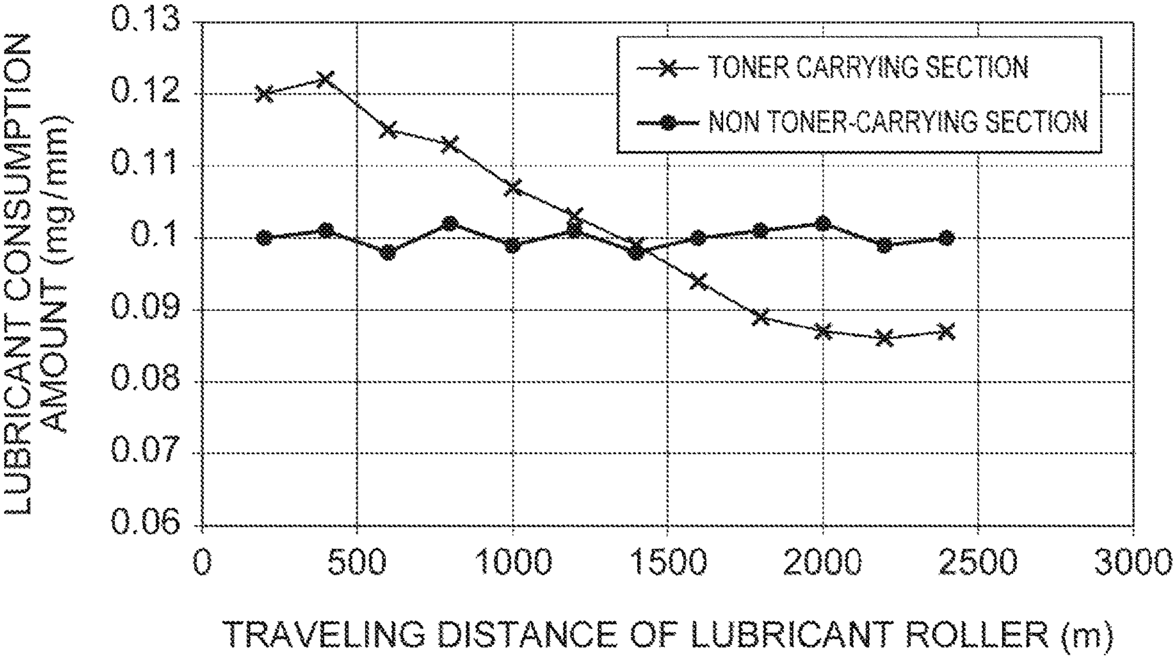
FIG. 6 is a graph of lubricant consumption amounts of a toner carrying section and a non-toner carrying section of a lubricant roller in an imaging apparatus, relative to a travel distance of the lubricant roller.
Figure 7:
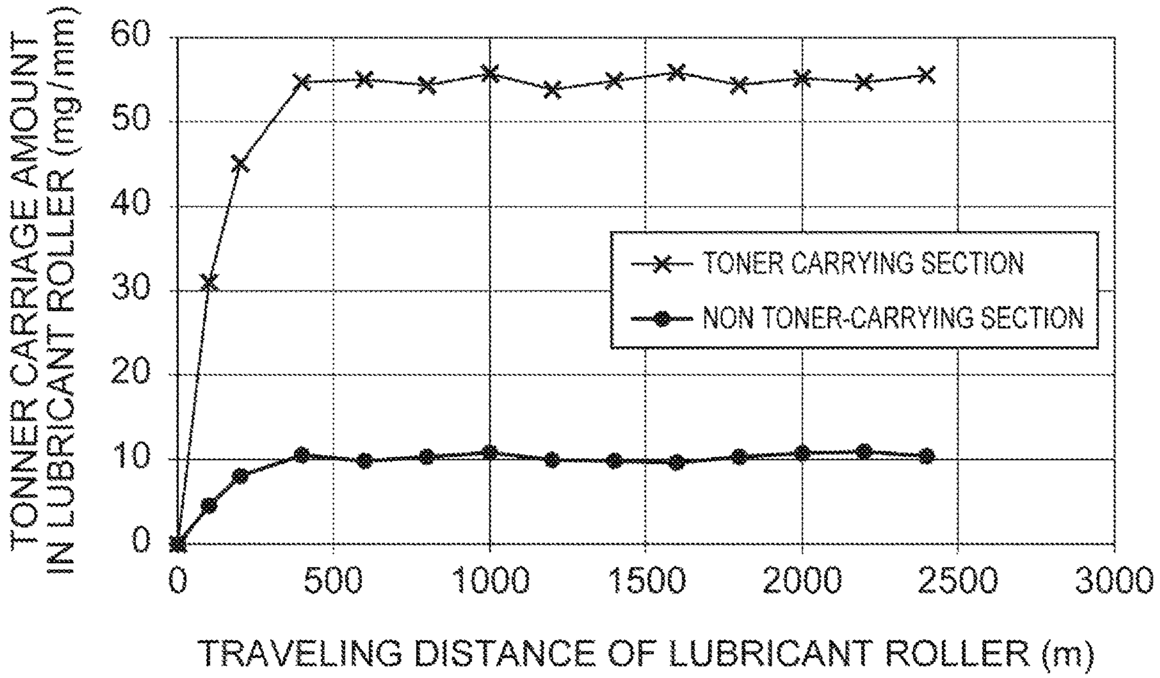
FIG. 7 is a graph showing toner carriage amounts in the lubricant roller at the toner carrying section and at the non-toner carrying section of the imaging apparatus represented in FIG. 6, relative to the travel distance of the lubricant roller.

FIG. 6 is a graph showing lubricant consumption amounts by section (e.g., lubricant section consumption amounts) in a toner carrying section (or toner input section) of the lubricant roller (associated with the center portion C1 of the printing sheet P1 in FIG. 5) and a non-toner-carrying section (or toner non-input section) of the lubricant roller (associated with the remaining portion C2 of the printing sheet P1 in FIG. 5) in the second imaging apparatus relative to the travel distance of the lubricant roller. FIG. 7 is a table showing toner carriage amounts of the lubricant roller in the toner carrying section and the non-toner-carrying section of the same second imaging apparatus as for FIG. 6 relative to the travel distance of the lubricant roller. With reference to FIG. 6, a greater amount of the residual toner remains on the image carrier in the toner carrying section, which functions as an abrasive. Initially, a greater amount of the lubricant is consumed in the toner carrying section as compared to the non-toner carrying section. With reference to FIG. 7, the toner carriage amount in the toner carrying section of the lubricant roller greatly exceeds a reference value of 20 mg/mm and increases with the travel distance of the lubricant roller.

Figure 8:
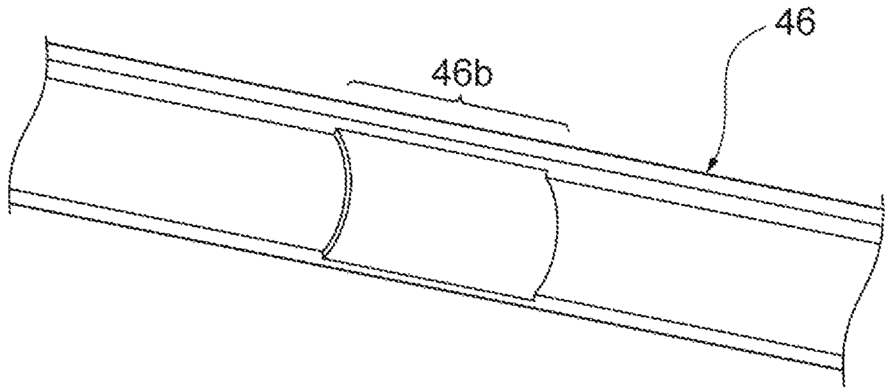
FIG. 8 is a perspective view illustrating an example solid lubricant when the example image shown in FIG. 5 is printed repeatedly.

When an image printing process is performed continuously or repeatedly in the above-described second imaging apparatus, a region 46*b* in the contact surface of the solid lubricant 46, that is aligned with the center portion C1 of the printing sheet P1 (cf. FIG. 5), is consumed substantially exclusively, such that a recessed portion is formed in the solid lubricant 46 as illustrated in FIG. 8, and accordingly, the lubricant roller is inhibited from receiving a sufficient amount of the lubricant at the recessed region 46*b*. As a result, as shown in the graph of FIG. 6, the lubricant consumption amount at the toner carrying section decreases relative to the travel distance of the lubricant roller, in comparison to the lubricant consumption amount in the non-toner carrying section. Accordingly, the consumption amount of the lubricant applied to the lubricant roller tends to be uneven along the longitudinal direction of the roller and the surface protection of the image carrier also tends to be uneven. Accordingly, the wear rate of the image carrier increases and filming occurs.

Figure 9:
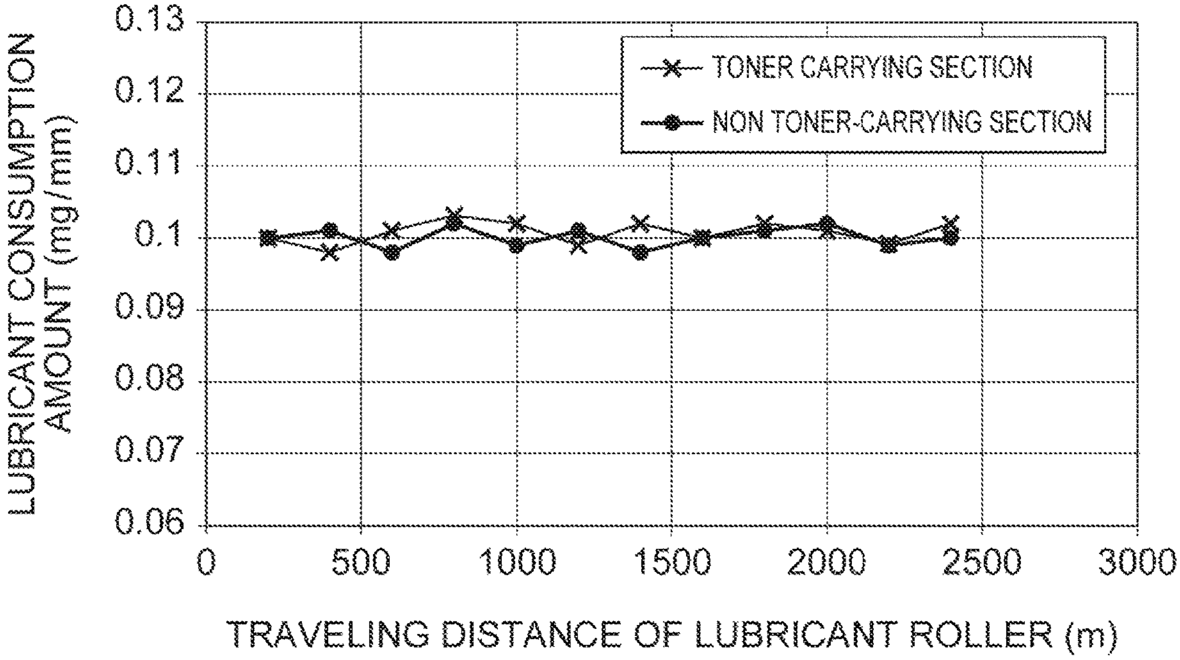
FIG. 9 is a graph showing lubricant consumption amounts at a toner carrying section and at a non-toner carrying section in the lubricant roller of the example lubricant applying device illustrated in FIG. 2, relative to the travel distance of the lubricant roller.
Figure 10:
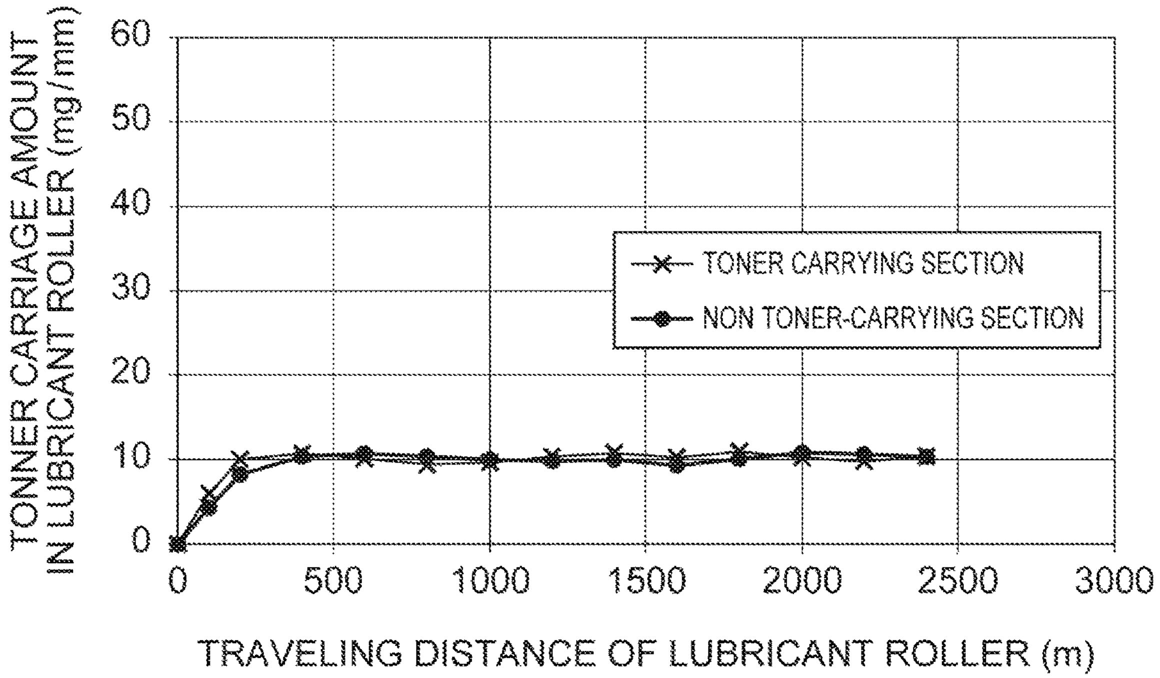
FIG. 10 is a graph showing the toner carriage amounts at the toner carrying section and at the non-toner carrying section in the lubricant roller of the lubricant applying device illustrated in FIG. 2, relative to the travel distance of the lubricant roller.

FIG. 9 is a graph showing lubricant consumption amounts in a toner carrying section (or toner input section) and a non-toner carrying section (or toner non-input section) of the lubricant roller of the example imaging apparatus 1 that includes the above-described lubricant applying device 4, relative to the travel distance of the lubricant roller. In the example lubricant applying device 4, a foam corresponding to prototype S3 was used as the foam 45*b* of the lubricant roller 45. FIG. 10 is a graph showing toner carriage amounts of the lubricant roller in the toner carrying section and the non-toner carrying section of the example lubricant applying 4, relative to the travel distance of the lubricant roller. The toner carrying section is associated with the center portion C1 of the printing sheet P1 (cf. FIG. 5) and the non-toner carrying section corresponds to the remaining portion C2 of the printing sheet P1 (cf. FIG. 5). With reference to the graphs of FIGS. 9 and 10, in the lubricant applying device 4, the lubricant consumption amount and the toner carriage amount of the lubricant roller are maintained substantially stable or constant for both the toner carrying section and the non-toner carrying section of the lubricant roller, as the travel distance of the lubricant roller 45 increases. In addition, the toner carriage amount of the lubricant roller 45 is approximately 20 mg/mm or less.

In the example lubricant applying device 4, the foam 45*b* accommodating the residual toner has a permeability in the range of 0.15 $dm^3/s$ to 1.4 $dm^3/s$. Accordingly, a targeted airflow is generated in the foam 45*b* toward the outside upon releasing the foam 45 having been compressed at the upstream region A1 (a nip entrance) of the image-carrier contact region and at the upstream region A2 (a nip entrance) of the lubricant contact region, in the rotational direction of the lubricant roller 45. Accordingly, most of the toner is released from the foam 45*b* (not held in the foam 45*b*), so as to be projected out (e.g., to fly out) of the foam 45*b* as the lubricant roller rotates. With such an operation, the lubricant roller 45 is inhibited from holding an uneven amount of toner, and the amount of lubricant supplied to the image carrier 40 is maintained substantially even along the longitudinal direction, so as to protect the image carrier 40.

Figure 11:
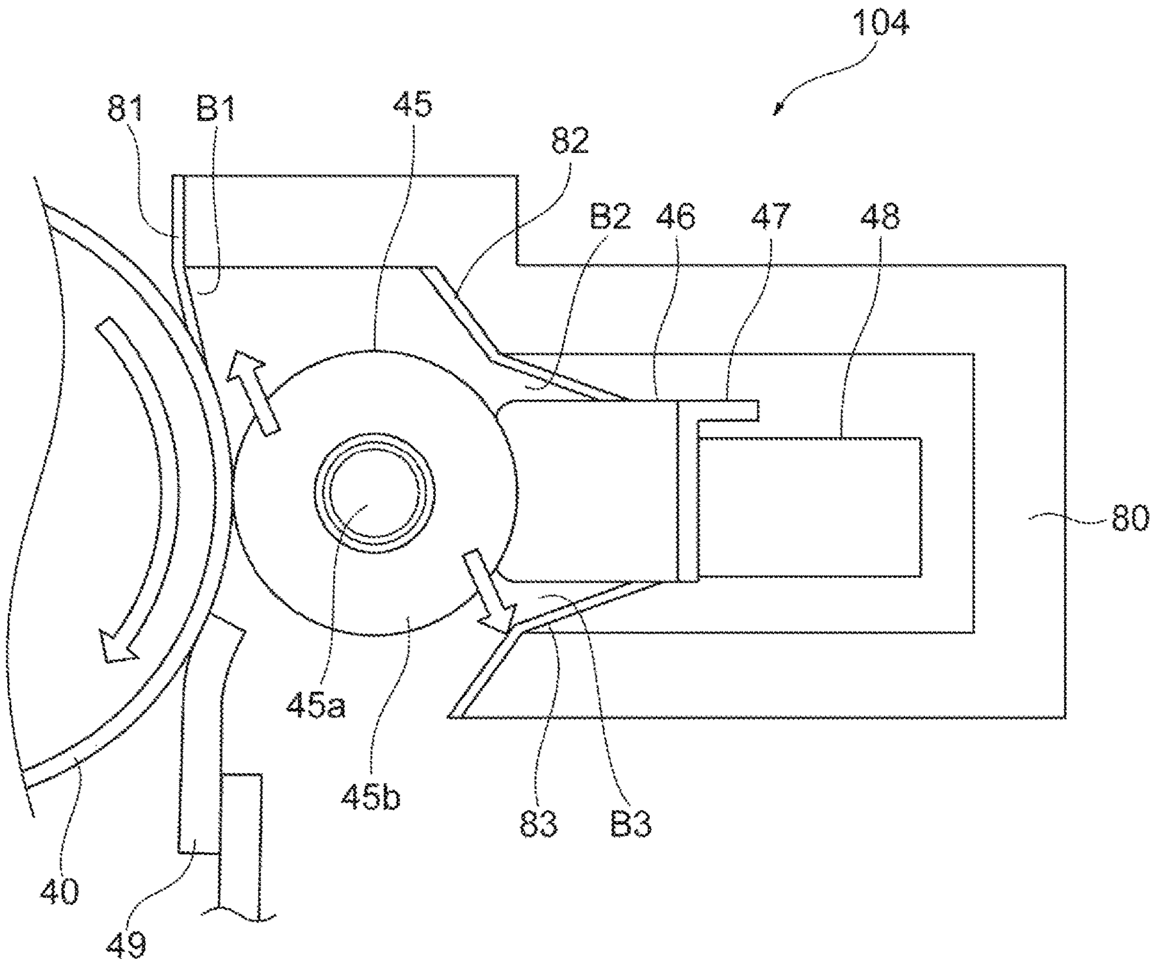
FIG. 11 is a schematic diagram of a lubricant applying device according to a modified example.

A modified example of the lubricant applying device 4 will be described with reference to FIG. 11. FIG. 11 is a schematic diagram of a lubricant applying device 104 according to the modified example. Similarly to the lubricant applying device 4 (cf. FIG. 2), the lubricant applying device 104 of FIG. 11 includes a lubricant roller 45, a solid lubricant 46, a holding member 47 and a pressing member 48, and the lubricant roller 45 is disposed on the upstream side of the cleaning blade 49 in the rotational direction of the image carrier 40. The lubricant applying device 104 further includes a frame 80 and protective sheets 81 to 83 that form a toner discharge preventing device.

The frame 80 accommodates the lubricant roller 45, the solid lubricant 46, the holding member 47, and the pressing member 48 therein. The protective sheets 81 to 83 are formed by, for example, insulating sheets of urethane mylar, and extend in a direction parallel to the axial direction of the lubricant roller 45. The protective sheet 81 is disposed so as to block a gap B1 between the image carrier 40 and the frame 80 while contacting the surface of the image carrier 40. The protective sheets 82 and 83 are disposed so as to block gaps B2 and B3 between the solid lubricant 46 and the frame 80 while contacting the surface of the solid lubricant 46. The protective sheets 82 and 83 contact the solid lubricant 46 with a load that is within a range 0.005 N/cm to 0.2 N/cm (or 0.5 gf/cm to 20 gf/cm), for example. When a load of the solid lubricant 46 pressed against the lubricant roller 45 is relatively high, the protective sheets 82 and 83 may be urged to contact the solid lubricant 46 with a load within the above-described range or more.

In the above-described lubricant applying device 4 (cf. FIG. 2), the permeability of the foam 45*b* of the lubricant roller 45 is set to a predetermined range, to form an outward airflow so that a predetermined amount or more of the toner is discharged from the foam 45*b* to the outside (cf. FIG. 11). When the lubricant applying device 4 is operated continuously such that the toner is discharged freely and released from the lubricant roller 45, the toner may flow into the arrangement area (e.g., the surrounding region) of the pressing member 48. Accordingly, when the toner is continuously used the toner may accumulate in the surrounding region and clog the pressing member 48, such that the pressing member 48 cannot apply a targeted load to the lubricant roller 45. In the example lubricant applying device 104 of FIG. 11, the protective sheets 82 and 83 are provided so as to block the gaps B2 and B3, to prevent the flow (or inflow) of the toner. If toner is discharged to the outside through the region indicated by the gap B1 between the frame 80 and the image carrier 440, the electrostatic latent image formed on the image carrier 40 and transferred may be affected. Accordingly, the protective sheet 81 is provided so as to block the gap B1, to prevent the discharge of the toner to the image carrier 40. The above-described toner discharge preventing device directs the toner more reliably to collect and discard the waste toner discharged from the lubricant roller 45 to the outside via an internal airflow at a more suitable location. Additionally, other configurations may be adopted for preventing the diffusion of the toner discharged from the lubricant roller 45.

It is to be understood that not all aspects, advantages and features described herein may necessarily be achieved by, or included in, any one particular example. Indeed, having described and illustrated various examples herein, it should be apparent that other examples may be modified in arrangement and detail is omitted.

The invention claimed is:

1. An imaging system comprising:

a lubricant roller to transfer a lubricant to an image carrier, wherein the lubricant roller includes a foam that is in contact with the image carrier, and wherein the foam is selected to have a permeability of approximately 0.15 $dm^3/s$ to 1.4 $dm^3/s$;

a solid lubricant in contact with the lubricant roller to supply the lubricant to the lubricant roller; and a pressing member to urge the solid lubricant against the lubricant roller.

2. The imaging system according to claim 1, wherein the foam of the lubricant roller is selected to have a density of approximately 48 $kg/m^3$ to 67 $kg/m^3$, and to have a 25% hardness measured based on a JIS K 6400-2 Method D, of approximately 185 N to 305 N.

3. The imaging system according to claim 1, wherein the foam of the lubricant roller is selected to have a permeability of approximately 0.5 $dm^3/s$ to 1.2 $dm^3/s$.

4. The imaging system according to claim 1, wherein the foam of the lubricant roller is selected to maintain a toner carriage amount at approximately 20 mg/mm or less when the imaging system is operated.

5. The imaging system according to claim 1, comprising:

a frame accommodating the solid lubricant, wherein a gap is formed between the frame and the solid lubricant; and an insulating sheet to block the gap, wherein the insulating sheet extends longitudinally in a direction parallel to an axial direction of the lubricant roller, and wherein the insulating sheet additionally extends from the frame to the solid lubricant, to contact the solid lubricant.

6. The imaging system according to claim 5, wherein the insulating sheet contacts the solid lubricant with a load of approximately 0.005 N/cm to 0.2 N/cm.

7. The imaging system according to claim 5, wherein the insulating sheet is a first insulating sheet and wherein the gap between the frame and the solid lubricant is a first gap, wherein a second gap is formed between the frame and the image carrier, and wherein the imaging system comprises a second insulating sheet to block the second gap, wherein the second insulating sheet extends longitudinally in the direction parallel to the axial direction of the lubricant roller, and additionally extends from the frame to the image carrier to contact the image carrier.

8. The imaging system according to claim 1, wherein a selection of the foam is based on a selection test.

9. The imaging system according to claim 1, a frame accommodating at least the solid lubricant;

a first insulating sheet extending in a direction parallel to an axial direction of the lubricant roller; and a second insulating sheet extending in the direction parallel to the axial direction of the lubricant roller, wherein the first insulating sheet blocks a first gap between the frame and the solid lubricant and the second insulating sheet blocks a second gap between the frame and the image carrier.

10. The imaging system according to claim 1, the pressing member to urge the solid lubricant with a load of approximately 0.1 N to 6 N.

11. The imaging system according to claim 1, wherein the lubricant roller includes a shaft extending in an axial direction of the lubricant roller, and wherein the foam is shaped as a cylindrical foam covering an outer periphery of the shaft portion, and wherein the cylindrical foam has a thickness of approximately 1 mm to 4 mm, in a radial direction of the lubricant roller.

12. The imaging system according to claim 1, wherein the image carrier has an outermost layer including a protective layer formed of an organic compound, and the protective layer contains approximately 1% by mass to 30% by mass of filler particles having an average particle size of approximately 50 nm to 500 nm.

13. The imaging system according to claim 1, comprising: a cleaning blade to scrape off a residual toner on a surface of the image carrier, wherein the lubricant roller is disposed on an upstream side of the cleaning blade in a rotational direction of the image carrier.

* * * * *